United States Patent [19]

Davis

[11] 4,237,751

[45] Dec. 9, 1980

[54] MOTION TRANSMITTING DEVICE

[76] Inventor: Roland O. Davis, 4451 White Pine La., Santa Ynez, Calif. 93460

[21] Appl. No.: 932,896

[22] Filed: Aug. 11, 1978

[51] Int. Cl.³ .............................................. F16H 1/28
[52] U.S. Cl. ..................................... 74/801; 74/804
[58] Field of Search ................. 74/640, 650, 804, 63, 74/214, 215, 391, 409, 434, 437, 439, 440, 444, 801

[56] References Cited

U.S. PATENT DOCUMENTS

| | | | |
|---|---|---|---|
| 2,932,986 | 4/1960 | Musser | 74/640 X |
| 3,039,324 | 6/1962 | Waterfield | 74/63 X |
| 3,407,902 | 10/1968 | Musser | 74/640 X |
| 3,604,287 | 9/1971 | Humphreys | 74/804 X |
| 3,996,816 | 12/1976 | Brighton | 74/640 |

FOREIGN PATENT DOCUMENTS 700404 12/1940 Fed. Rep. of Germany ............. 74/640

*Primary Examiner*—C. J. Husar
*Assistant Examiner*—Moshe I. Cohen
*Attorney, Agent, or Firm*—David O'Reilly

[57] ABSTRACT

A motion transmitting device for transferring rotary motion with high efficiency and very large speed ratios and at speed ratios very close to unity. A rigid cylindrical outer member contains a flexible, spring-like inner member having a larger outer circumference than the inner circumference of the outer member, thus causing at least one area of separation or disengagement where the flexible inner member is forced inwards away from the outer member. Drive means are provided by a third member which cause the area or areas of disengagement to move around the interface between the inner and outer members producing a rotation of the inner member in a precessing fashion in the same direction as the area of disengagement with respect to the outer member, but at a much reduced rate. The rate of movement of the inner member with respect to the outer member is proportional to the ratio of the difference between the outer circumference of the inner member and the inner circumference of the outer member to the inner circumference of the outer member. The mating surfaces of the inner and outer members may be provided with gear teeth of the same pitch with the inner member having a slightly larger number due to its larger size. The mating surfaces may also be smooth or roughened depending upon the friction desired to prevent slipping at least up to a predetermined torque.

18 Claims, 12 Drawing Figures

MOTION TRANSMITTING DEVICE

BACKGROUND OF THE INVENTION

This invention relates generally to motion transmitting systems and more particularly relates to a motion transmitting system having internal and external members with mating surfaces.

Among the devices for transmitting motion are devices referred to as harmonic drives. In these devices an internal flexible spline mates with an external member having an overall circumference larger than the flexible member. A third member is necessary in order to force a relatively small portion of the internal flexible spline into contact with the outer member at any given moment. In order to improve the efficiency of these devices and prevent backlash, numerous attempts have been made to increase the contact area of the flexible internal spline with the outer member. While there have been some improvements made, the problems inherent in these devices have not been entirely eliminated because the amount of contact area between the inner and outer members is necessarily limited by the fact that the inner member must have a smaller circumference than the outer member.

SUMMARY OF THE INVENTION

The purpose of the present invention is to provide an improvement in motion transmitting systems by providing an entirely new basic concept for transmitting the motion of a rotary drive system.

The present invention provides an entirely new, basic concept in that the internal flexible member of the motion transmitting device has an outer circumference larger than the internal circumference of an external rigid member wherein the ratio of these mating or contacting circumferences is very close to unity. The larger circumference of the inner flexible member causes one or more areas of separation or disengagement which can be large or small. Motion is transmitted by a drive system which causes the area or areas of separation or disengagement to move around the mating surfaces of the inner and outer members, thus transferring the motion from the input drive to a shaft connected to the inner member. Thus, the precessional drive system disclosed herein can provide a very large reduction ratio proportional to the ratio of the difference between the outer circumference of the inner member and the inner circumference of the outer member to the inner circumference of the outer member. A reduction ratio very close to unity can be provided if the drive means are held stationary and the outer rigid member or the inner flexible member driven.

The mating surfaces between the inner and outer members can be provided with teeth of the same pitch with the inner member having a slightly larger number of teeth. For example, the inner member could have 101 teeth to 100 for the outer member, producing a reduction ratio of 1 to 100, when the outer member is fixed and the inner member connected to the output. Alternatively, the mating surface between the inner and outer members can be smooth or slightly roughened to prevent slippage or to provide controlled slippage between the inner flexible member and the outer rigid member above a predetermined torque.

The drive system for driving the separation or hump in the inner flexible member can be in a variety of forms. One method would be to have rollers on either side of the hump attached to a drive shaft to push the hump around the interface, causing a rotation of the inner member with respect to the outer member. The hump could also be driven by a member closely fitting the inside surface of the flexible member including a slot or recess contoured to the shape of the hump. As the shaft turns, the slot and hump rotate with it. Another possible variation would be that of having a magnetic bar on the end of the shaft having its pole adjacent to the hump. In this case the inner flexible member would be constructed of some magnetic material so that the hump would be attracted to and follow the movement of the magnetic bar with shaft. One more possible variation would be to have a stator located inside the inner member or outside the outer member which would cause a rotating magnetic field which would in turn cause the hump in an inner flexible member made of magnetic material to follow the rotation of the magnetic field, thus causing the inner member to rotate at a much reduced rate.

Further reduction ratios can be realized by the construction of multi-stage devices. These can be in the form of multiple units having the output of one connected to the input of another or by constructing an integral, multiple-stage device. In the multiple-stage devices having the input of one connected to the output of the other, the output shaft of one stage acts as the input drive shaft for the drive means in the succeeding series connected stage. An integral multiple-stage device can be constructed of an integral unit having a first flexible member inside a first rigid member connected to a second rigid member. A second flexible member would be reversibly installed inside the first flexible and rigid members. The first flexible member would have a slightly larger outside perimeter than the first rigid member creating a first hump and the second flexible member would have an outside perimeter slightly larger than the second rigid member, causing a second hump on the peripheral edge of the second flexible member opposite that of the hump on the peripheral edge of the first flexible member. An input drive system would drive the hump on the second flexible member which in turn would drive the hump on the first flexible member through a rigid ring attached to the second flexible member having a slot or recess engaging the hump on the first flexible member. This would produce an output having a reduction ratio equal to the product of the individual reduction ratios of each stage. These multiple-stage devices would permit the production of extremely large reduction ratios in a device having high outstanding torque capabilities with almost no backlash as in the single-stage device.

Accordingly, it is one object of the present invention to provide a motion transmitting device for transferring rotary motion with a high speed ratio.

Another object of the present invention is to provide a motion transmitting device having a speed ratio very close to unity.

Still another object of the present invention is to provide a motion transmitting device with a high speed ratio in a compact package with a high torque capacity.

Yet another object of the present invention is to provide a motion transmitting device having an extremely low backlash potential and high efficiency.

Still another object of the present invention is to provide a motion transmitting device in which a flexible member is fitted inside a rigid member with the flexible member having a larger circumference than the rigid member.

Another object of the present invention is to provide a motion transmitting device having a flexible inner member of larger circumference inside a rigid member with the interface between the two members having teeth.

Yet another object of the present invention is to provide a motion transmitting device having a flexible member of larger circumference inside a rigid member with the interface between the two members comprised of surfaces relying on sliding friction only.

Still another object of the present invention is to provide a motion transmitting device with a plurality of stages to provide a reduction ratio equal to the product of the reduction ratios of the individual stages.

Other objects, advantages and novel features of the invention will become apparent from the following detailed description of the invention when considered in conjunction with the accompanying drawings wherein like reference numbers identify like parts throughout.

DETAILED DESCRIPTION OF THE PREFERRED EMBODIMENT

Figure 1:
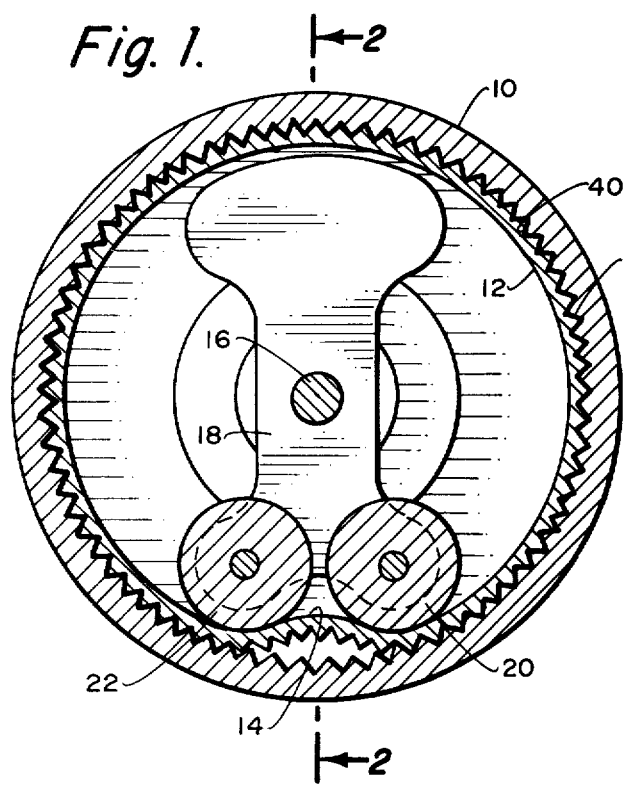
FIG. 1 is a sectional view of a precessional drive according to the invention.

The motion transmitting apparatus according to the invention is illustrated in FIG. 1 in which there is an outer rigid member 10 having an inner flexible member 12 having a larger outer circumference than the inner circumference of the rigid member 10 which produces a separation or hump 14. The size of the area of disengagement of hump 14 is determined by the outer circumference of 12 relative to the inner circumference of the rigid member 10. Thus, by making the inner member 12 larger or smaller the area of separation 14 can be made larger or smaller within certain limits.

The outer rigid member 10 and inner flexible member 12 should preferably be of the same shape. Thus, the two members 10, 12 may be right circular cylinders, slightly conical or even elliptical. However, a substantially cylindrical shape is preferred because it would be the easiest to make and the most suitable.

Figure 2:
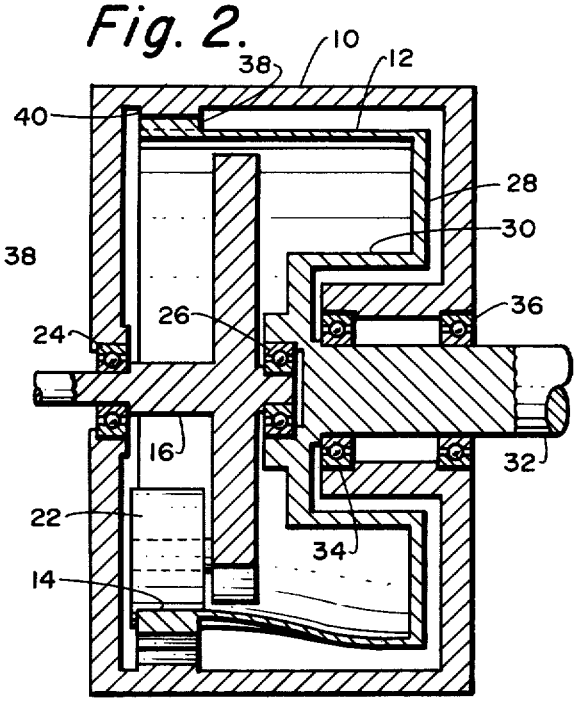
FIG. 2 is a sectional side elevation of the precessional drive taken at 2—2 of FIG. 1.

The drive system for the device is provided by a shaft 16 having a counter balance bar which has rollers 20 and 22 engaging the hump 14. A single roller 20 would be sufficient to drive in one direction only, but two rollers are provided for improved control and for driving the hump 14 in either direction. A potential disadvantage of a single roller is the delay in reversal when the roller must rotate around to engage the hump 14 from the other side; however, in some applications, this might be desirable. The construction of the various elements of the invention are further illustrated in the sectional side elevation of FIG. 2. In this figure the rigid housing 10 provides support for bearings 24 supporting the shaft 16 which rotates the rollers 20 and 22. The other end of shaft 16 is supported by bearings 26 which are supported by a hub 30. The inner flexible member 12 is attached to a plate 28 connected through hub 30 to an output shaft 32 rotating in bearings 34 and 36, which are also supported by housing 10. In the embodiment illustrated in FIGS. 1 and 2, teeth 38 and 40 are provided in the inner flexible member and the outer rigid member respectively. As illustrated in FIG. 2, only the end of the inner flexible member 12 is provided with teeth and engages the teeth on the inner surface of the rigid outer member 10.

The reduction ratio of the device illustrated in FIGS. 1 and 2 is equal to the difference between the outer circumference of the inner flexible member 12 and the inner circumference of the outer rigid member 10, divided by the inner circumference of the outer rigid member 10. Thus, if the inner flexible member has an outer circumference of 101 units and the rigid member 10 has an inner circumference of 100 units, then the reduction ratio obviously would be 100 to 1.

As was indicated previously, the ratio can be varied by varying the circumferences such that the hump 14 is increased or decreased within certain limits. The minimum circumference of the inner flexible member would be where, for all intents and purposes, the two circumferences between the flexible member and the rigid member are substantially equal, while the maximum circumference of the flexible member would likely be that which would cause the largest separation or hump 14 which could be easily driven.

Figure 3:
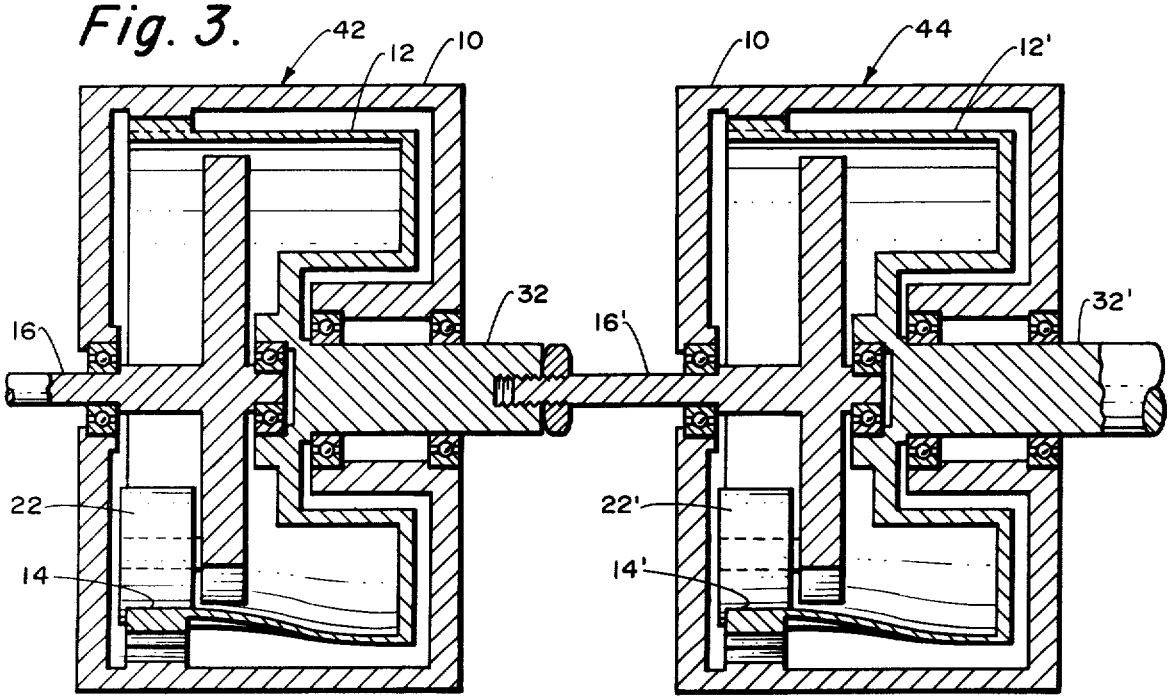
FIG. 3 is a sectional side elevation of a multiple-stage precessional drive.
Figure 5:
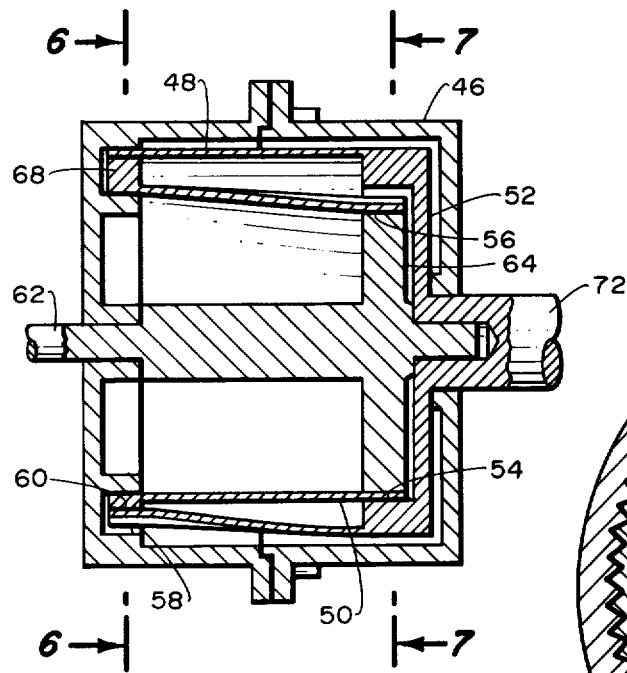
FIG. 5 is a sectional side elevation of an integral two-stage precessional drive according to the invention.

For larger reduction ratios than those achievable in a single-stage drive, multiple-stage devices such as those illustrated in FIGS. 3 and 5 are contemplated. The simplest multiple-stage drive is illustrated in FIG. 3 where a first stage 42 has its output shaft 32 connected to the input shaft 16' of the second stage 44, which in turn produces an output on shaft 32'. The multiple-stage series connected devices illustrated in FIG. 3 could be expanded with additional units connected in series, if desired. The series connected devices illustrated in FIG. 3 are merely to illustrate by way of example the multiple-stage precessional drive for increased reduction ratios. Thus, there are many modifications which will be obvious to one skilled in the art. For example, the rigid housing 10 and 10' could be a single rigid housing with the output from the first flexible member 12 directly driving the second flexible member 12'.

A system somewhat like this is illustrated in FIG. 5. In this embodiment there is a rigid housing 46 enclosing a first flexible member 48 inside of which is a second flexible member 50. As with the single-stage device, the members may be cylindrical, conical or elliptical. The first flexible member 48 is mounted on a hub 52 which constitutes the second rigid member, forming a cylinder 54 inside of which the end of the second flexible member 50 fits. The outside diameter of the second flexible member 50 is larger than the inside diameter of the cylinder 54, thus forming a hump or separation 56 caused by an area of disengagement between the second flexible member 50 and the second rigid member 52. The rigid housing 46 also forms a cylindrical chamber 58 which constitutes the first rigid member into which the first flexible member 48 fits. Again, the first flexible member 48 has a larger outer circumference than the inner circumference of the rigid cylindrical portion 58 of housing 46, causing an area of disengagement creating a second hump or separation 60.

Figure 7:
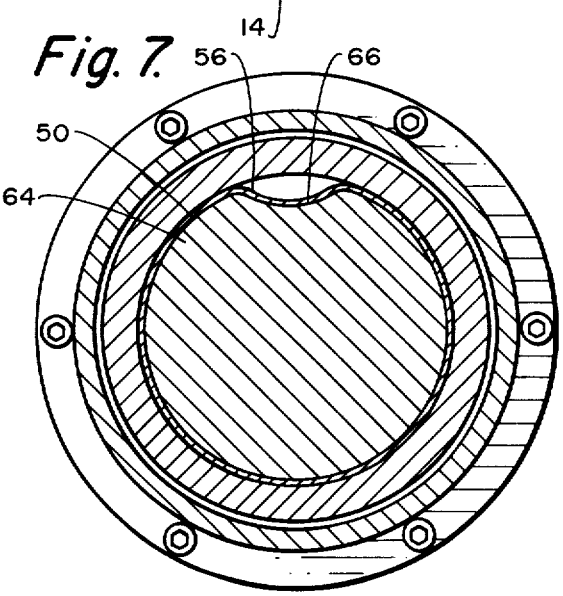
FIG. 7 is a sectional view of a two-stage precessional drive taken at 7—7 of FIG. 5.
Figure 8A:
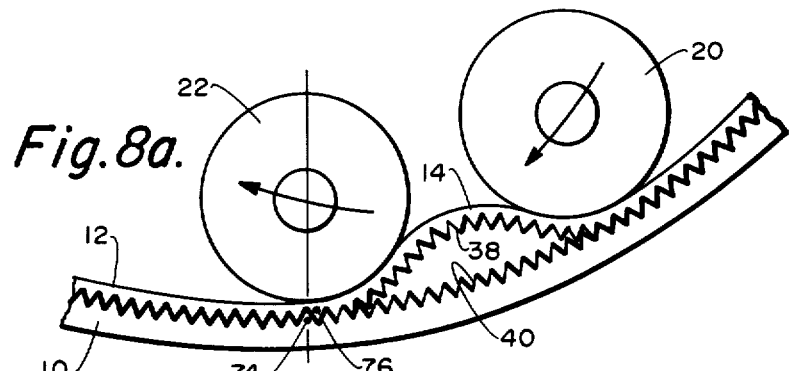
FIGS. 8a through 8e are enlarged diagrams in schematic form illustrating the motion transference function according to the invention.
Figure 8B:
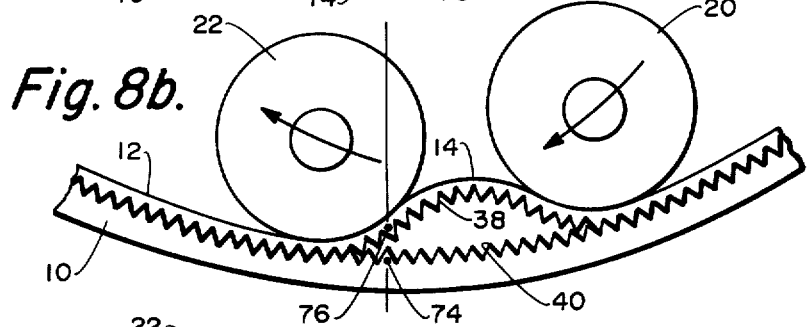
Figure 8C:
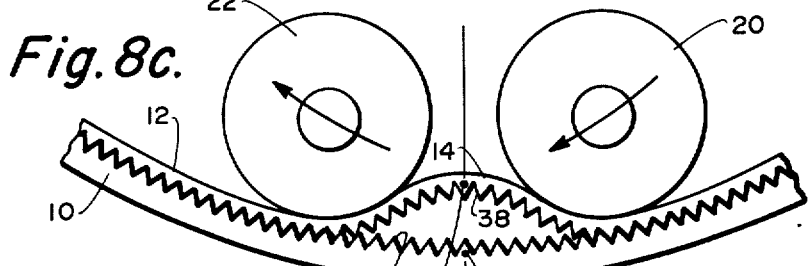
Figure 8D:
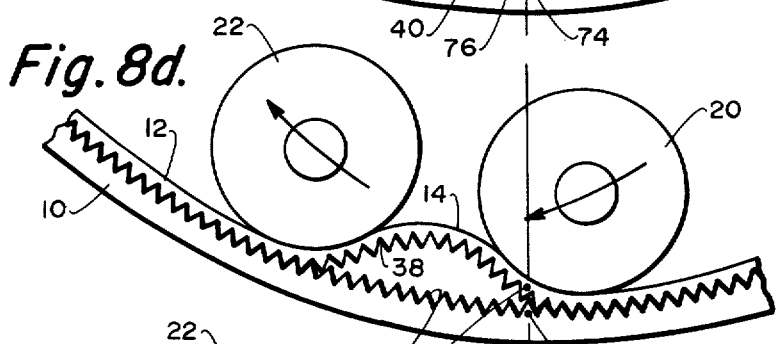
Figure 8E:
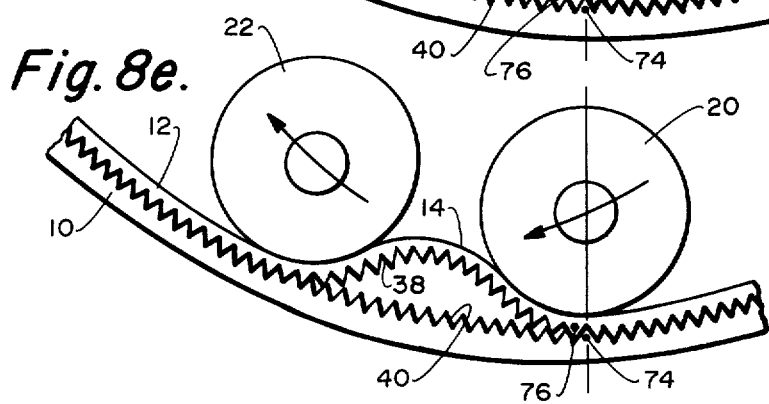

The hump 56 comprises the first stage and is driven by an input shaft 62 on which is mounted a disc 64 having a contoured recess, indentation or slot 66 fitting the shape of the hump 56 in the second flexible member 50, as is more clearly illustrated in FIG. 7. As the input shaft 62 rotates, the slot 66 fitting the hump 56 causes it to rotate around thus driving the second inner flexible member 50.

Attached to the inner flexible member 50 is a ring 68 also having a slot, indentation or recess 70 fitting the hump 60 in the first flexible member 48. This ring 68 being an integral part attached to the second flexible member 50 rotates at a rate determined by the movement of the first-stage hump 56. The movement of the second-stage hump 60 creates a movement of the first flexible member 48, thus causing the hub 52 to rotate producing an output from the second stage on shaft 72.

Figure 6:
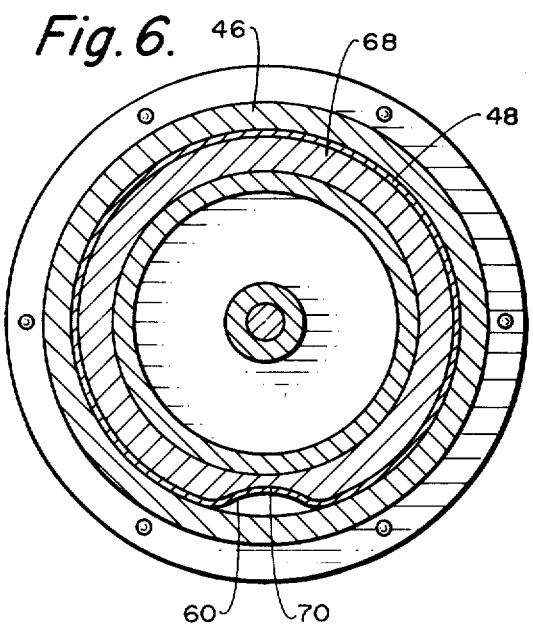
FIG. 6 is a sectional view of the two-stage precessional drive of FIG. 5 taken at 6—6.

Thus, the system of FIGS. 5 through 7 provides an integral two-stage precessional drive in which the reduction ratio from input to output is proportional to the circumferences of the respective flexible members 48 and 50, to the cylinders 54 and 58. Thus, if the reduction ratio of each stage were 100 to 1, then the reduction ratio from input shaft 62 to output shaft 72 would be approximately 10,000 to 1. The reduction ratio would actually be 9999 to 1, because the outer rigid member 54 for the second flexible member 50 is part of hub 52 which is attached to the first flexible member 48 and therefore rotates with the output shaft 72.

In operation the input shaft 62 would drive the disc 64 which would cause the first-stage hump 56 to move around with the matching recess 66 in the disc 64. This would cause the first stage or second flexible member 50 to rotate with respect to the first-stage outer rigid member or hub 52 at a rate proportional to the difference in the mating circumference of the first flexible member 50 with respect to the cylinder 54. The rotation would be in the same direction as the rotation of the input shaft 62.

The first stage comprised of the second inner flexible member 50 then would drive the second-stage driver or ring 68 which would cause the area of disengagement between the first inner flexible member 48 and the outer rigid member 46 to move around concurrently with the matching recess 70 in the ring or second-stage driver 68. This would cause the second stage or first flexible member 48 to rotate with respect to the outer rigid member 46 at a rate proportional to the difference between the mating circumference of the first flexible member 48 and that of the cylinder 58 in the rigid member 46 to the mating circumference of the cylinder 58, and in the same direction as the rotation of the ring 68. The output shaft 72 would then be driven by the motion of the first flexible member 48 attached to the hub 52.

The integral two-stage precessional drive illustrated in FIGS. 5 through 7 also shows one method of driving the respective separations 56 and 60 between smooth mating surfaces relying on surface friction only. That is, the mating surfaces of the respective stages do not have any teeth and may be smooth or slightly roughened to provide a predetermined maximum torque at which slippage may occur. Also in this system it should be noted that the drive system for the separations or humps 56 and 60 comprise slots in a disc in one case and in a ring in another, rather than the rollers illustrated in FIG. 1. Various other methods for driving the hump will be readily obvious to those skilled in the art. One method of driving these humps contemplated is that of using a magnetic bar in place of the bar 18 and rollers 20 and 22. In this case the inner flexible member 12 would be constructed of a magnetic material so that the hump 14 would be attracted to the pole of the magnet. Thus, as the magnet rotates by rotary motion of the shaft 16, the hump would tend to follow the direction of rotation of the magnet.

Figure 4:
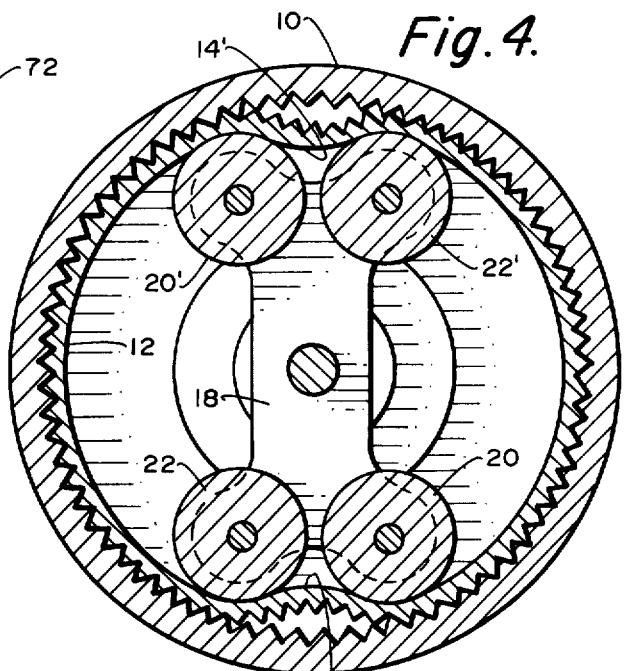
FIG. 4 is a sectional view of a modified form of a precessional drive of FIG. 1.

In addition to the use of smooth surfaces or magnets for driving the separation, modifications, such as illustrated in FIG. 4, can be perceived. For example, there could be a plurality of separations or humps 14 and 14' in order to increase the relative outer circumference of the inner member 12 with respect to the outer rigid member 10. These humps 14 and 14' could be driven by additional rollers 20' and 22' on the opposite end of counterbalance rod or bar 18. Again, the multiple humps 14 and 14' could be driven by recessed members such as that illustrated at 64 in FIG. 7 or by magnets. Additional separations or humps could be provided within certain limits. It is contemplated that one or two would be preferable with an additional number used only in specific circumstances for a specific purpose.

The relative movement of the inner flexible member 12 with respect to the outer rigid member 10 is illustrated schematically in FIGS. 8a through 8e. As can be visualized from these figures, the hump 14 moves around the circumference of the outer rigid member at a rate equal to the rotation of the input shaft 16 (not shown). However, the inner flexible member only moves a small incremental amount for each rotation of the hump 14. As can be seen by the tooth in the outer rigid member 10, represented by the dot 74, relative to the tooth in the flexible member 12, represented by the dot 76, the hump 14 moves past the tooth 74 but the respective teeth only move a small incremental amount. Thus, as can be seen the tooth 76 in the flexible member 12 moves only one tooth over as the hump or separation 14 moves past the tooth 74 in the rigid member 10. Thus, for each revolution of input shaft 16, the hump 14 makes one complete revolution around the circumference of the inner flexible member but the inner flexible member only moves an amount equal to one tooth of the multiple teeth 38, mating with the teeth 40 in the outer rigid member. Therefore, while the motion of the separation 14 coincides with the motion of rollers 20, 22 and input shaft 16, the inner flexible member 12 only moves a small amount proportional to the relative circumferences of the rigid member 10 to the flexible member 12.

As can readily be seen from the diagrams illustrating the motion transmitting in FIGS. 8a through 8e, there is a large mating surface between the outer rigid member 10 and the inner flexible member 12. That is, there is only a small area of separation 14, substantially reducing, if not altogether eliminating, backlash potential due to the mating of the gears 38 and 40. In the usual gear system, only a small portion of the respective gears are in contact at any moment in time, thus creating a very large potential for backlash. This is also true of the so-called harmonic drives in which the outer diameter of the inner flexible member is smaller than the inner diameter of the outer rigid member creating large areas of disengagement. Further, with the relatively large area of contact between the outer rigid member 10 and the inner flexible member 12, large torques can be accommodated between the input and output. Efficiency is greatly improved by the relatively small amount of friction involved in the unmeshing and meshing of teeth at the leading and trailing edges of the area of disengagement. Further, while the invention has been described as a reduction mechanism for motion transmitting it obviously could be used for stepping up motion by driving the respective members in reverse. That is, the flexible member could be driven, thus effectively driving the rollers 20 and 22 and the input shaft 16 would then become the output shaft. Likewise, the rigid housing 10 could be driven while the flexible member 12 is held stationary. Numerous variations of input and output connections are possible, permitting torque conversion or motion transferral in a variety of fashions.

Obviously, many modifications and variations of the present invention are possible in light of the above teachings. It is therefore to be understood that the full scope of the invention is not limited to the details disclosed herein but may be practiced otherwise than as specifically described.

What is claimed is:

1. A motion transmitting device comprising:
   an outer member having a curved internal surface;
   a flexible member having a curved external surface mating with the curved internal surface of said outer member;
   said flexible member having a longer curved outside perimeter than the inside perimeter of the curved surface of the outer member causing at least one area of separation of the inner member; and
   drive means for driving said separation around the curved interior surface of said outer member whereby rotational motion may be transmitted.

2. The motion transmitting device according to claim 1 including:
   gear teeth on the inside surface of said outer cylindrical member; and
   gear teeth on the exterior surface of said flexible cylindrical member engaging the gear teeth on said outer member and having the same pitch as the gear teeth on the outer cylindrical member.

3. The motion transmitting device according to claim 1 wherein the speed ratio is selected according to the ratio of the difference between the circumference of the outer surface of the inner member and the circumference of the inner surface of the outer member divided by the circumference of the inner surface of the outer member.

4. The motion transmitting device according to claim 1 including means for connecting a plurality of motion transferring devices in series comprising:
   a shaft connected to said flexible member for rotation therewith; and
   said shaft connected to the drive means of an adjacent motion transferring device constructed according to claim 1.

5. The motion transmitting device according to claim 1 including:
   means for holding the flexible member stationary, whereby the outer member rotates in the opposite direction of the driving means.

6. The motion transmitting device according to claim 1 including:
   means for holding the outer cylindrical means stationary,
   whereby the flexible member rotates in a precessional manner in the same direction as the driving means.

7. The motion transmitting device according to claim 1 including:
   means for holding the drive means stationary,
   whereby rotation of said outer member causes rotation of said flexible member or vice versa.

8. The motion transmitting device according to claim 1 wherein said drive means is in the form of a disc having an indentation conforming to the shape of said separation between said outer member and said flexible member.

9. The motion transmitting device according to claim 1 wherein the interior surface of said outer cylindrical member and the mating surface of said flexible member are in frictional engagement.

10. The motion transmitting device according to claim 9 wherein the surface friction between the mating surfaces of the flexible and outer members is preselected to control the slippage between the flexible and outer members whereby said motion transmitting device also functions as a torque limiting slip clutch.

11. The motion transmitting device according to claim 1 wherein:
    said outer member is in the form of a substantially circular cylinder.

12. The motion transmitting device according to claim 11 wherein the flexible member is in the form of a substantially circular cylinder of greater diameter than the outer member.

13. The motion transmitting device according to claim 1 including:
    a second flexible member inside said first flexible member which is attached to a rigid ring;
    said second flexible member having an external curved surface of longer periphery than the internal surface of said rigid ring attached to said first flexible member causing at least one area of separation of the inner second flexible member;
    a second drive means for the separation created by said second flexible member; and
    said drive means for the first flexible member being comprised of means attached to said second flexible member whereby an integral multiple-stage motion transmitting device is formed.

14. The motion transmitting device according to claim 13 wherein said second drive means comprises:
    an input shaft; and
    a disc drive on said input shaft having an indentation conforming to the separation of said second flexible member.

15. The motion transmitting device according to claim 14 wherein said drive means for the first flexible member comprises a ring on said second flexible member having an indentation conforming to and engaging the separation between the first flexible member and the outer member.

16. The motion transmitting device according to claim 1 wherein said drive means comprises:
    a shaft;
    means for rotating said shaft; and
    roller means attached to said shaft engaging said separation whereby rotation of said shaft causes said roller means to push said separation around said outer member.

17. The motion transmitting device according to claim 16 wherein said roller means comprises at least one pair of rollers on either side of said separation whereby rotation of said shaft in either direction causes movement of said separation.

18. The motion transmitting device according to claim 16 wherein:
    there are at least two areas of separation; and
    a roller means on said shaft for each separation.

* * * * *